US009668508B2

(12) United States Patent
Chandra et al.

(10) Patent No.: US 9,668,508 B2
(45) Date of Patent: Jun. 6, 2017

(54) DIETARY SUPPLEMENT DOSING DEVICE

(71) Applicant: Conopco, Inc., Englewood Cliffs, NJ (US)

(72) Inventors: Franklin David Chandra, Bangalore (IN); Manoj Vilas Dagaonkar, Brookefields (IN); Girish Shanka Gopalkrishna, Hassan (IN); Vetri Kumaran, Tamil Nadu (IN); Venkataraghavan Rajanarayana, Bangalore (IN)

(73) Assignee: Conopco, Inc., Englewood Cliffs, NJ (US)

( * ) Notice: Subject to any disclaimer, the term of this patent is extended or adjusted under 35 U.S.C. 154(b) by 37 days.

(21) Appl. No.: 14/437,700

(22) PCT Filed: Nov. 5, 2013

(86) PCT No.: PCT/EP2013/073027
§ 371 (c)(1),
(2) Date: Apr. 22, 2015

(87) PCT Pub. No.: WO2014/075950
PCT Pub. Date: May 22, 2014

(65) Prior Publication Data
US 2015/0296856 A1     Oct. 22, 2015

(30) Foreign Application Priority Data
Nov. 16, 2012    (EP) ...................................... 12192904

(51) Int. Cl.
*B01F 5/04*      (2006.01)
*A23L 2/52*      (2006.01)
(Continued)

(52) U.S. Cl.
CPC ................. *A23L 2/52* (2013.01); *C02F 1/686* (2013.01); *C02F 1/688* (2013.01); *E03C 1/00* (2013.01)

(58) Field of Classification Search
CPC .. C02F 1/688; C02F 1/686; A23L 2/52; E03C 1/00
(Continued)

(56) References Cited

U.S. PATENT DOCUMENTS 2,564,618 A * 8/1951 Williams ................ C02F 1/686
                                                 239/310
3,334,657 A * 8/1967 Smith .................... B01F 5/0256
                                                 118/308
(Continued)

FOREIGN PATENT DOCUMENTS

CN    101732899    6/2010
CN    202116359    1/2012
(Continued)

OTHER PUBLICATIONS

Search Report in EP12192904 dated Apr. 11, 2013. pp. 1 to 2.
(Continued)

*Primary Examiner* — Umashankar Venkatesan
(74) *Attorney, Agent, or Firm* — Greenburg Traurig, LLP

(57) ABSTRACT

The present invention relates to a dietary supplement dosing device that can be connected to a source of water to enable dosing of dietary supplement to water at the time of dispensing. The dietary supplement dosing device is capable of dosing controlled amounts of the dietary supplement to water upon being dispensed for consumption by fitting it to a faucet and the dietary supplement dosed water is free of color, taste and odor and with beneficial amounts of dietary supplement. A dietary supplement dosing device comprises a flow distribution unit and a dietary supplement cartridge
(Continued)

and the dietary supplement cartridge can be designed to deliver the dietary supplement from a source which is either in the solid or liquid form.

12 Claims, 3 Drawing Sheets

(51) Int. Cl.
*C02F 1/68* (2006.01)
*E03C 1/00* (2006.01)

(58) Field of Classification Search
USPC .......................................................... 137/268
See application file for complete search history.

(56) References Cited

U.S. PATENT DOCUMENTS

| | | | |
|---|---|---|---|
| 3,727,760 A | 4/1973 | Soriano et al. | |
| 4,702,270 A | 10/1987 | King | |
| 4,735,348 A * | 4/1988 | Santoiemmo | B67D 1/0412 222/399 |
| 6,298,871 B1 | 10/2001 | Pickens | |
| 6,983,867 B1 * | 1/2006 | Fugere | B05C 11/10 222/261 |
| 8,701,946 B1 * | 4/2014 | Fugere | B05C 11/10 222/1 |
| 2014/0193308 A1 | 7/2014 | Chauvin | |
| 2015/0128811 A1 * | 5/2015 | Durairajasivam | C02F 1/003 99/283 |

FOREIGN PATENT DOCUMENTS

| | | |
|---|---|---|
| EP | 0751097 | 1/1997 |
| FR | 2722577 | 1/1996 |
| FR | 2809330 | 11/2011 |
| WO | WO2007029183 | 3/2007 |
| WO | WO2008129260 | 10/2008 |
| WO | WO2010055775 | 5/2010 |
| WO | WO2010083149 | 7/2010 |
| WO | WO2012136577 | 10/2012 |

OTHER PUBLICATIONS

Search Report in PCTEP2013073027 dated Jan. 29, 2014. pp. 3 to 5.
Written Opinion in EP12192904 dated Apr. 11, 2013. pp. 6 to 8.
Written Opinion in PCTEP2013073027 dated Jan. 29, 2014. pp. 9 to 12.

* cited by examiner (a) (b) (c) (d)

(a) (b) (c) (d)

DIETARY SUPPLEMENT DOSING DEVICE

FIELD OF THE INVENTION

The present invention relates to a dietary supplement dosing device that can be connected to a source of water to enable dosing controlled amounts of the dietary supplements to water at the time of dispensing. The present invention particularly relates to connecting the dietary supplement dosing device to a water purification device to consistently provide potable water having beneficial amounts of dietary supplement.

The invention has been developed primarily for use in drinking water application and will be described hereinafter with reference to this application. However, it will be appreciated that the invention is not limited to this particular field of use.

BACKGROUND OF THE INVENTION

Any discussion of the prior art throughout the specification should in no way be considered as an admission that such prior art is widely known or forms part of the common general knowledge in the field.

In general having a balanced diet to get enough vitamins and minerals from daily diet is preferable over getting them from supplements. The daily dosage of vitamins and minerals is defined in terms of Recommended Dietary Allowance (RDA). When people do not eat or get a healthy diet every day, taking a nutrient supplement that contains the recommended daily allowances for vitamins and minerals becomes necessary. Taking dietary supplement is particularly useful for people who have a vitamin or mineral deficiency. Common deficiencies that people may develop include deficiencies of Vitamin A, folic acid, Vitamin $B_{12}$, Vitamin C, Vitamin D, iron, calcium, magnesium, phosphorus, potassium, sodium, and zinc.

Iron and various other minerals are not always easily absorbed by the body. Hence, the salts of vitamins and minerals need to be chosen based on their enhanced bio-availability.

In many parts of the world there is shortage of electricity and availability of running water and hence the gravity fed water purifiers which do not require the use of electricity and running water supply have become very popular. Providing known amounts of vitamins and minerals by dosing controlled amounts of the dietary supplements to water is very useful and hence designing dietary supplement dosing devices which can be incorporated into the gravity fed water purifiers would be highly beneficial. In doing this one will ensure pure drinking water and at the same time deliver the dietary supplement.

Dosing water with a nutritional amount of vitamins and minerals may render the water with a disagreeable aftertaste, a change in colour of water and also impart an odour which is objectionable. One will like to have a glass of water without these organoleptic negatives. It is thus a challenge to design a device that purifies water and at the same time delivers the dietary supplement at a beneficial level without any organoleptic negatives.

There have been several attempts to provide water compositions fortified with vitamins and minerals while keeping in mind the need for making it free of objectionable colour, odour and taste.

Our co-pending application 747/MUM/2012, discloses a dietary supplement dosing device capable of releasing predetermined amounts of dietary supplement to water from a source of dietary supplement in the solid form. This application addresses fortifying using vitamins and minerals from a source of dietary supplements in the solid form thereby solving the problem over another co-pending application 2863/MUM/2011, where there is disclosed an on tap dietary supplement dispensing system wherein known amounts of dietary supplements are added to water in the liquid form. Both these applications address the problem of organoleptic negatives while fortifying water with vitamins and minerals. Providing the dietary supplement in the solid form solves the problem over the liquid dosing system where there is increased weight of the material during transport and storage or the chances of the liquid spillage during consumer handling.

FR2809330 (Inst Francais Du Petrole, 2001), discloses a device for measuring doses of a reagent by dissolution in a liquid flow, comprising a magazine containing a stack of tablets of reagent resting at the lower open end of the magazine on support means enclosed in an annular liquid feeding chamber, comprising orifices forming radial liquid jets on the base of the lower reagent tablet, the tablet supporting means forming liquid outlet means. The invention is particularly applicable to chlorination of drinking water.

The existing dosing systems are designed differently for dosing from a solid source as compared to the liquid source and can be used only with one type. Therefore there is a need for a dosing system to have a flow distribution mechanism that can be used irrespective of whether the source of the dietary supplement is in the solid or liquid form.

The present inventors have been able to design dosing systems that do not require any movable flow control element. This enables the device according to the present invention to function irrespective of the dosing source and at a much wider and higher range of flow rate of 500-3500 ml/min compared to throttled flow rate of 400-1200 ml/min and significantly reduces the number of parts like a float or a spring controlled valve based mechanism to control the flow rate thus saving on material usage and making it economical. The absence of flow control element enables reduction of the size and to design a compact unit which also has more tap clearance.

It is an object of the present invention to provide a dietary supplement dosing device capable of releasing predetermined amounts of dietary supplement to water, from a source of dietary supplement provided either in the solid or liquid form, to enable dosing controlled amounts of the dietary supplement of water upon being dispensed for consumption.

It is another object of the present invention to provide a dietary supplement dosing device that does not require any movable flow control elements like float or a spring controlled valve based mechanism but can effectively dose controlled amounts of the dietary supplement to water that is dispensed at a wide range of flow rate and higher range of flow rate of 500-3500 ml/min.

It is yet another object of the present invention to provide water free of colour, taste and odour and with beneficial amounts of dietary supplement.

It is yet another object of the present invention to provide a dietary supplement dosing device to be fitted to the faucet of a gravity fed water purification device.

SUMMARY OF THE INVENTION

It has now been found that dietary supplement can be dosed into a stream of water with consistent/controlled concentrations over a wide range of flow rates (e.g. 500-3500 ml/min) without the necessity of moving parts. More specifically, it has unexpectedly been found that this object could be achieved by providing a flow distribution chamber, in which a stream of water can be divided into a part which is fed into a dietary supplement cartridge via an outlet port and another part which by-passes the supplement cartridge and exits the distribution unit via at least one by-pass outlet opening. Consistent dosing is achieved by providing the by-pass outlet opening with a particular shape.

Therefore, according to the present invention there is provided a dietary supplement dosing device comprising:
- a. a flow distribution unit (1) and
- b. a dietary supplement cartridge (8)

wherein said flow distribution unit comprises a flow distribution chamber (2) comprising
- a. a water inlet port (7),
- b. at least one water outlet opening (3) located on an upwardly extending wall of the flow distribution chamber; and
- c. a water outlet port (4)

wherein said water outlet port (4) is in fluid communication with a water entry port (6) of the dietary supplement cartridge;
wherein the lowest point of said opening (3) and said water outlet port (4) are substantially at the same level;
wherein the area A spanning the area of said opening (3) from its lowest point up to given height h is a non-linearly increasing function of the height h, wherein the height h runs from the lowest point of the opening (3) up to the total height of opening (3); and wherein the water outlet opening (3) comprises one or more through holes, wherein the holes are shaped such that the overall width of said opening at a given height h with respect to the lowest point of said opening substantially decreases with increasing height h A dietary supplement cartridge can be designed to deliver the dietary supplement from a source which is in the solid or liquid form.

According to another aspect of the invention the dietary supplement dosing device comprises a flow distribution unit and a dietary supplement cartridge wherein said dietary supplement cartridge comprises a container (9) with water-leachable dietary supplement in a solid form (10) resting on a base (11); said base having at least one entry port (6) for passage of feed water and at least one exit port (12) for dietary supplement dosed water; wherein said entry port (6) of dietary supplement cartridge is connectable to the water outlet port (4) of the flow distribution chamber of the flow distribution unit.

According to yet another aspect of the invention the dietary supplement dosing device comprises a flow distribution unit and a dietary supplement cartridge wherein said dietary supplement cartridge comprises:
- i. a dispensing unit (16) comprising dietary supplement stock solution having a viscosity in the range of 50 cP to 2000 cP, said unit having a vent (19) to the atmosphere positioned above the level of said dietary supplement stock solution;
- ii. an entry port (6) connected to a differential pressure unit (15), comprising an exit port (12), a dosing tube (18) having a diameter in the range of 0.5 mm to 3 mm connected at one end to the point of minimum pressure (17) of said differential pressure unit while the other end of the dosing tube dips into said dietary supplement stock solution; wherein said entry port (6) is connectable to the outlet port (4) of the flow distribution chamber of the flow distribution unit.

The features and advantages of the invention will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples, embodiment and figures given in the description below are intended to clarify the invention and are not intended to limit the invention to those examples per se.

DETAILED DESCRIPTION OF THE INVENTION

The present invention provides for a dietary supplement dosing device having a flow distribution unit and a dietary supplement cartridge and a flow distribution chamber without needing movable flow control means.

Flow Distribution Unit

The flow distribution unit comprises a flow distribution chamber, a water inlet port, at least one water outlet opening on an upwardly extending wall of the flow distribution chamber and a water outlet port. The water outlet port is in fluid communication with water entry port of the dietary supplement cartridge.

Flow Distribution Chamber

The flow distribution unit of the dietary supplement dosing device has a flow distribution chamber which has a water inlet port, at least one water outlet opening and a water outlet port. The shape of the flow distribution chamber is preferably a cube, cuboid, cylindrical or conical or any other suitable shape and more particularly it is cuboidal.

The water outlet opening is located on an upwardly extending wall of the flow distribution chamber and the area A spanning the area of the water inlet opening from its lowest point up to given height h is a non-linearly increasing function of the height h, wherein the height h runs from the lowest point of the opening up to the total height of the opening. It is particularly clarified that a particular area A of the water outlet opening means the area below a particular height h. This area A is a non-linearly increasing function along the height of the opening. In other words, this area typically is the integral of the width w of the opening over an interval of the total height starting at the lowest point of the opening and up to a given height h, which may be expressed as:

$$A(h) = \int_0^h w \, dh$$

where w is not constant along the height of the opening.

It is preferred that the non-linearly increasing function is a power law function where the exponent has a value between 0 and 1. It is preferable that the non-linearly increasing function is in accordance with the Power law as defined by $$A(h) = a \cdot h^k$$

whereby a is a constant and k is the exponent and whereby k is between 0 and 1, excluding the endpoints 0 and 1.

Alternatively, the shape may be more complex and described by a polynomial expression:

$$A(h) = \Sigma_n a_n \cdot h^{k_n},$$

whereby the largest of the exponents $k_n$ is between 0 and 1, excluding the endpoints 0 and 1.

Alternatively, the water outlet opening comprises one or more through holes, wherein the holes are shaped such that the overall width of the opening at a given height h with respect to the lowest point of said opening substantially decreases with increasing height h. Here, the substantially decreasing means that the shape of the opening is such that shape narrows towards the top of the opening. For instance, the shape of the opening can be tapered from its lowest towards its highest point. Substantially decreasing also means that the opening can also comprise sections which are locally widening, or locally of constant width. This is for instance the case if the opening consists of a plurality of vertically spaced circular or square through holes.

The largest width of the water outlet opening is preferably close to its lowest point. More preferably, the largest width of the water outlet opening is at its lowest point.

Thus, it is possible that the water outlet opening comprises one or more openings positioned on any of the upwardly extending walls of the flow distribution chamber. The water outlet opening is preferably shaped in such a way that the trend of increase in the area of the opening is a non-linearly increasing function of the height of the opening on the chamber. The shape of the water outlet opening can preferably be triangular, triangular with a constriction at the middle, smooth parabolic, a plurality of circles, ovals or squares or combinations of the aforementioned. The lowest point of the water outlet opening and water outlet port are substantially at the same level.

The water outlet port is positioned on any of the walls of flow distribution chamber and preferably at the base of the chamber and is connected to the dietary supplement cartridge. The flow distribution chamber is provided with a water inlet port that can receive water from the faucet through preferably a tap connector. It is preferred that when in operation at least 60% of water entering from the faucet into the flow distribution chamber passes through the water outlet opening located on the upwardly extending wall. The total area of the water outlet opening available for flow of water is preferably 2 to 10 times greater than the flow area of the water outlet port.

Flow Rate of Feed Water:

During operation the flow rate of feed water from the faucet entering the tap connector is preferably in the range of 500-3500 ml/minute more preferably 800-2500 ml/minute.

Dietary Supplement Cartridge

The dietary supplement dosing device includes a dietary supplement cartridge. The dietary supplement cartridge preferably includes an entry port for passage of feed water, an exit port for dietary supplement dosed water and a container comprising at least one dietary supplement in the solid or liquid form.

When the dietary supplement is in the solid form it is preferably in the form of a tablet in the container.

Container:

In one embodiment the container includes at least one dietary supplement in the solid form and preferably in the form of a tablet.

Preferably the container of the dietary supplement cartridge has a plurality of stacked dietary supplement tablets, preferably 1 to 12, more preferably 3 to 10 and still more preferably 6 to 8 tablets. Preferably the container has a movable support resting on the topmost tablet. The movable support may be a plate, a disc or a tablet shaped member, most preferably a tablet shaped member, made of plastic. The movable support is preferably brightly coloured e.g. in red, blue or green. The container preferably has a closed top end and a resilient member between the movable support and the closed top end. The resilient member may be a spring or a bellow.

The movable support resting above the topmost dietary supplement tablet descends by the force of gravity as the tablets are consumed. The resilient member provides additional force to ensure that the movable support descends as the tablets are consumed by urging against the movable support.

The dietary supplement tablet is preferably circular, square, rectangular, hexagon or oval in shape. The leading cross sectional dimension is preferably from 1.0 cm to 5.0 cm, more preferably from 1.0 cm to 3.0 cm. The tablet preferably has a thickness in the range of 0.5 cm to 10.0 cm, more preferably 1.0 cm to 5.0 cm.

In another embodiment the dietary supplement is provided in the liquid form, the container comprising the dietary supplement stock solution is provided in a dispensing unit.

Dispensing Unit

The dispensing unit is preferably cylindrical in shape but other suitable shapes may also be used. The dispensing unit preferably comprises a container comprising the dietary supplement stock solution. The container comprising fresh dietary supplement stock solution may be connected in an inverted configuration for leak-tight dispensing of fresh dietary supplement stock solution. The dietary supplement stock solution may be replenished in the dispensing unit from time to time, as desired, using fresh stock solution from such a container. It is a preferable aspect of the present invention that the dispensing unit comprises a vent to the atmosphere above the maximum attainable solution level. The vent is preferably on the top surface of the dispensing unit. The vent is preferably cylindrical in shape although any other suitable cross section may be used. The vent is preferably provided with a filter, preferably an air filter, to minimize ingress of dust and other contaminants from the atmosphere into the dietary supplement stock solution. The filter preferably has a pore size in the range of 0.05 µm to 1 µm. It has been observed that if this vent is not provided in the dispensing unit, the desired amount of dietary supplement stock solution dosed in to the water is not consistent over time especially when the level of the dietary supplement changes over the course of use.

The dosing device preferably comprises a differential pressure unit, comprising an entry port connectable to the flow distribution chamber and an exit port to dispense dietary supplement dosed water. The differential pressure unit is preferably a venturi. It is preferably not horizontally configured and as per a highly preferred aspect, it is vertically configured. Preferred shapes of the differential pressure unit are to have the entry port, the exit port and the point of minimum pressure to be circular. Preferred dimensions are as follows for the leading dimensions of the various features: entry port: 4 mm to 8 mm, exit port 4 mm to 8 mm, point of minimum pressure 2 mm to 5 mm. The differential pressure unit is operational by ensuring that dimensions of the point of minimum pressure are smaller than the dimensions of the entry and exit ports.

To transfer the dietary supplement stock solution from the dispensing unit to the running water, a dosing tube having an inner diameter in the range of 0.5 mm to 3 mm, preferably in the range of 0.5 mm to 1.5 mm is connected at one end to the point of minimum pressure of the differential pressure unit while the other end of the dosing tube dips into the dietary supplement solution in the dispensing unit. The length of the dosing tube is preferably from 5 mm to 50 mm, more preferably from 5 mm to 15 mm. The inner surfaces of the dispensing unit, differential pressure unit and the dosing tube are preferably lined with a hydrophobic material selected from ultra low surface energy materials or ultra hydrophobic surfaces containing highly refined surface micro textures or nano textures.

Dietary Supplement:

Preferably the composition of the dietary supplement tablet according to the invention may be selected from one or more of a vitamin, mineral, electrolyte, flavour or a nutrient or a mixture thereof. The dietary supplement may be sourced from either a chemical or natural source.

According to a highly preferred aspect of the present invention, a natural source of vitamin and mineral is *Phyllanthus emblica* (Amla) extract.

Amla primarily includes tannins, bioflavonoids, carotenoids, alkaloids, and phenolic compounds, amino acids and carbohydrates which have extraordinary longevity and rejuvenating properties. Synthetic vitamin C does not provide vital nutrients such as rutin and bioflavonoids. Amla is valued for its unique tannins and flavonoids, which exhibit very powerful antioxidant properties. Amla is considered as a more potent antioxidant than Vitamin C. Vitamin C in Amla accounts for ~45-70 percent of the antioxidant activity. There are no RDA levels for Amla.

The present inventors have determined that it is beneficial to dose it in a range between 2 ppm to 50 ppm and preferably between 5 ppm to 10 ppm since at concentrations more than 10 ppm, the dietary supplement dosed water is likely to get slightly coloured. It is preferred that we dose the vitamins and minerals at 10-20% of the recommended daily allowance (RDA) per liter of water. The dosage of these dietary supplements is selected such that it does not impart any negative organoleptic property to the water.

Water may also be dosed with dietary supplement such as Iron using the device of the invention. Iron compounds which may be dosed include a water-soluble iron compound, a water-dispersible particulate iron compound, or mixtures thereof. In addition, the iron compound of the present invention is preferably selected from a complexed iron compound, a chelated iron compound, an encapsulated iron compound, or mixtures thereof. Highly bioavailable iron compound is preferably chosen to provide maximum health benefits.

Iron-dosed water usually suffers from a metallic taste/aftertaste. The elimination of the metallic taste can be achieved by encapsulating the iron compound.

The metallic taste can also be eliminated by binding the iron into a stable compound by complexing or chelating with a suitable ligand that does not permit the iron to be freely associated in water.

Preferred iron compound forms also include encapsulates and complexes that preferably have a dispersed particle size in the water that is small enough to be barely visible in solution. Preferably, the dispersed particle size is about 100 nanometers (nm) or less, and more preferably about 80 nm or less.

Ferrous iron is typically better utilized by the body than ferric iron. Ferrous amino acid chelates are particularly suitable as highly bioavailable forms when the ligand to metal ratio is at least 2:1. Highly bioavailable food grade ferrous salts that can be used in the present invention include ferrous sulphate, ferrous fumarate, ferrous succinate, ferrous gluconate, ferrous lactate, ferrous tartarate, ferrous citrate, ferrous amino acid chelates, as well as mixtures of these ferrous salts. Certain ferric salts can also provide a highly bioavailable source of iron. Highly bioavailable food grade ferric salts are ferric saccharate, ferric ammonium citrate, ferric citrate, ferric sulfate, ferric chloride, as well as mixtures of these ferric salts.

Other bio-available sources of iron particularly suitable for dosing water of the present invention include certain iron-sugar-carboxylate complexes. In these iron-sugar-carboxylate complexes, the carboxylate provides the counter ion for the ferrous (preferred) or ferric iron.

The USRDA for iron generally ranges from 10 mg per 6 kg female or male to 18 mg per 54-58 kg female, depending somewhat on age.

The iron dosed water prepared using the device of the present invention typically contains at least about 1 ppm of iron compound, sufficient to deliver about 10% of USRDA of iron per liter of water to account for iron that is available from other dietary sources, assuming a reasonably balanced diet is available.

The water compositions of the present invention preferably may also contain nutrients, for example vitamin C, vitamin E, vitamin A, niacin, vitamin $B_6$, vitamin $B_2$, vitamin $D_2$, vitamin $B_{12}$, folate, zinc, electrolytes such as salts of sodium, potassium or magnesium and mixtures thereof.

The typical values for most healthy adults are generally: vitamin C (60 mg), vitamin A (2000 IU/day) vitamin $B_2$ (1.7 mg), niacin (20 mg), vitamin $B_6$ (2.0 mg), folic acid (0.2 mg/day), vitamin $D_2$ (400 IU/day), vitamin $B_{12}$ (0.001 mg/day) magnesium (300 mg), zinc (11 mg/day) and vitamin E (30 international units). The adequate intake value of sodium is generally 1.5 g and for potassium is generally 4.7 g.

Alternatively, commercially available sources of vitamin C may be used herein. Encapsulated ascorbic acid and edible salts of ascorbic acid may also be used. Commercially available vitamin A sources may also be incorporated into the water composition. Vitamin A can be provided, for example, as vitamin A palmitate (retinol palmitate), vitamin A acetate and/or as beta-carotene. It can be as an oil, as a beadlet or may be encapsulated. As used herein, "vitamin A" includes vitamin A, β-carotene, retinol palmitate and retinol acetate. Commercially available sources of vitamin $B_2$ (riboflavin) can be used herein. Nutritionally supplemental amounts of other vitamins for incorporation into the water include, but are not limited to, vitamins $B_6$ and $B_{12}$, folate, niacin and vitamins $D_2$ (ergocalciferol) and E. Preferred salt for vitamin $B_{12}$ is 5,6 DNB cyanocobalamide and for folate is folic acid.

Sodium salts can be selected from sodium chloride, sodium ascorbate, sodium citrate, sodium ferric pyrophosphate, sodium gluconate, sodium phosphate, sodium pyrophosphate or mixtures thereof. Potassium salts can be selected from potassium chloride, potassium gluconate, potassium glycerophosphate, potassium iodide or mixtures thereof. Magnesium salts can be selected from magnesium gluconate, magnesium phosphate, magnesium sulfate or mixtures thereof. Zinc salts can be selected from zinc oxide, zinc gluconate, zinc sulfate or mixtures thereof.

Preferably, the water prepared using the device of the invention contains 10-20% of the USRDA or adequate intake value for these vitamins, minerals or electrolytes.

Other vitamins, minerals and electrolytes can also be incorporated into the water depending on the nutritional needs of the consumers to which the water product is directed.

The composition of the present invention may optionally include a sweetener. Such sweetening agents are added to the water to mask a metallic taste or after-taste caused by the minerals or vitamins. Suitable particulate sugars can be granulated or powdered, and can include sucrose, fructose, dextrose, maltose, corn maltodextrin, lactose and mixtures thereof. Most preferred is sucrose. Artificial sweeteners may also be used. Often gums, pectins and other thickeners are used with artificial sweeteners. Mixtures of sugars and artificial sweeteners may also be used.

The water can optionally include a flavouring agent. The flavouring agent may be of any natural or synthetically prepared fruit or botanical flavours or with mixtures of botanical flavours and fruit juice blends. Suitable natural or artificial fruit flavours include lemon, orange, grapefruit, strawberry, banana, pear, kiwi, grape, apple, mango, pineapple, passion fruit, raspberry and mixtures thereof. Suitable botanical flavours include Jamaica, marigold, chrysanthemum, tea, chamomile, ginger, valerian, yohimbe, hops, eriodictyon, ginseng, bilberry, rice, red wine, mango, peony, lemon lavender, walnut, gentiam, cinnamon, aloe, peppermint and mixtures thereof. When present the flavouring agent is present from about 0.01% to about 10%, preferably from about 0.02% to 8%. The actual amount of flavouring agent will depend on the type of flavouring agent used and the amount of flavour desired in the dietary supplement dosed water. Most preferred flavouring agent is peppermint flavour.

The tablet composition preferably includes a filler. Suitable fillers include sparingly soluble salts of calcium and magnesium, natural gums and polysachharides. Examples of fillers include starch, calcium chloride, calcium carbonate, gum arabic, gum ghatti, inulin, carboxy methyl cellulose, vinyl pyrollidone-vinyl acetate copolymers. The tablet composition preferably includes less than 95% fillers, more preferably less than 90% and still more preferably less than 85% fillers.

It is preferred that the tablet composition has a dietary supplement to filler ratio of 1:10 more preferably 1:8, further preferably 1:6 and most preferably 1:3.

When the dietary supplement is provided in the liquid form the dietary supplement stock solution, as per the present invention has a viscosity in the range of 50 cP to 2000 cP preferably 100 cP to 600 cP measured at 20 s$^{-1}$. This narrow viscosity range is important to ensure that the opposing forces of suction and friction are balanced in such a way as to ensure the dosing concentration into the flowing stream of water in the desired narrow range. The dietary supplement stock solution is usually prepared by mixing the desired dietary supplement in water along with a viscosity enhancing agent. Various dietary supplements can be included in the stock solution for dosing into water using the device of the invention.

The viscosity of the dietary supplement stock solution in the desired range is higher than that of water and this is attained by including a viscosity enhancing agent in water. Preferred viscosity enhancing agent is selected from a viscosifier, thickener, emulsifier, stabilizer or gelling agent. The viscosity enhancing agent is preferably present in the range of 0.0001% to 40% by weight of the solution, more preferably 2% to 20% by weight of the solution. Examples of suitable viscosity enhancing agents are hydrocolloid, polysaccharide, pectins, casein, salts and glyceryl esters of fatty acids, polysorbates or mixtures thereof.

DETAILED DESCRIPTION OF THE DRAWINGS

Figure 1:
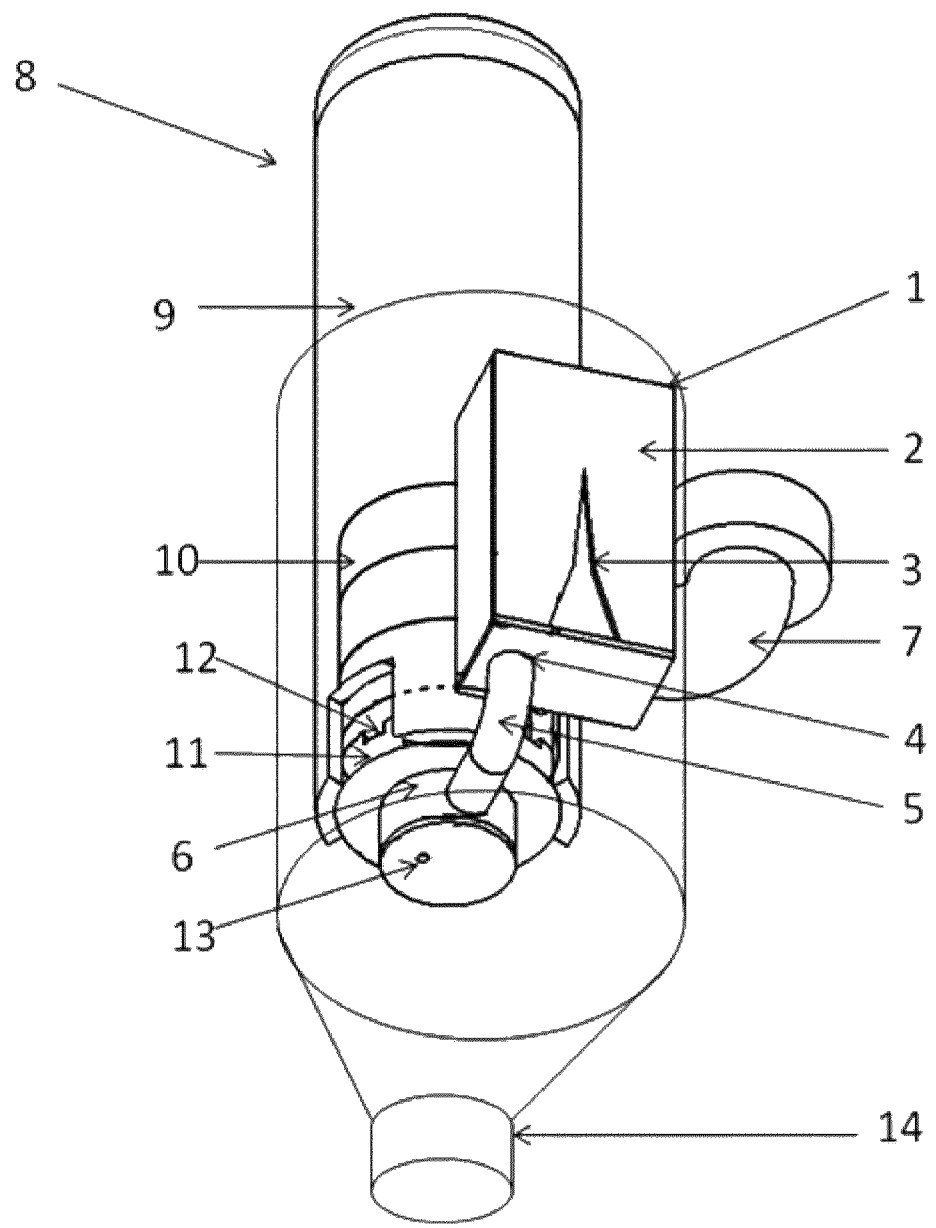
FIG. 1 is a perspective view of an embodiment of the dietary supplement dosing device in accordance with the invention.

FIG. 1 is a perspective view of an embodiment of the dietary supplement dosing device, comprising a flow distribution unit (1) having a flow distribution chamber (2) with at least one water outlet opening (3) on an upwardly extending wall and a water outlet port (4) from the flow distribution chamber to the dietary supplement cartridge. The dietary supplement cartridge (8) which has a container (9) holding at least one water-leachable dietary supplement in a solid form (10), which rests on a base (11). The cartridge has an entry port for feed water (6) and an exit port (12) for dietary supplement dosed water. The water outlet port (4) of the flow distribution chamber (2) is connected to the entry port (6) of the dietary supplement cartridge by means of a connector (5). The device is attached to the faucet using a tap connector to allow the water from the faucet to flow into the water inlet port (7). The device also comprises a drain hole (13) at the lowest point of the entry port (6) of the cartridge to avoid any water stagnation in the device. The device comprises of an outlet (14) to dispense water containing the dietary supplement.

When the faucet is opened, water from the faucet enters the flow distribution chamber (2) through the tap connector into the water inlet port (7). The water is then divided into two streams, one stream flows through the water outlet opening (3) and the other stream flows into the water outlet port (4) and enters the entry port (6) of the dietary supplement cartridge through the connector (5). The water then touches the base of the dietary supplement tablet (10) and exits through the exit port (12). The water from the water outlet opening (3) and the exit port (12) of the cartridge containing the dietary supplement get mixed and dispensed through outlet (14) as a single stream. When the faucet is closed, the water remaining in the connector (5) and entry port (6) drains out through the drain hole (13).

The flow rate of water entering the distribution chamber (2) may vary, due to the way in which the water is supplied. The water outlet opening (3) and the water outlet port (4) provide some resistance to the flow of water. Therefore, the level of the water in the distribution chamber rises when the flow rate of the entering water increases. However, due to the particular (tapered) shape of the opening 3, the area of the water outlet opening that is available for the water to leave via water outlet opening 3, varies non-linearly, more particularly, less than linearly with the level of the water. This in turn ensures that the water is distributed between water outlet opening (3) and water outlet port (4) such that the concentration of the dietary supplement in the water dispensed through the outlet (14) is controlled and is relatively independent of the flow rate over a wide range of flow rates.

Figure 2:
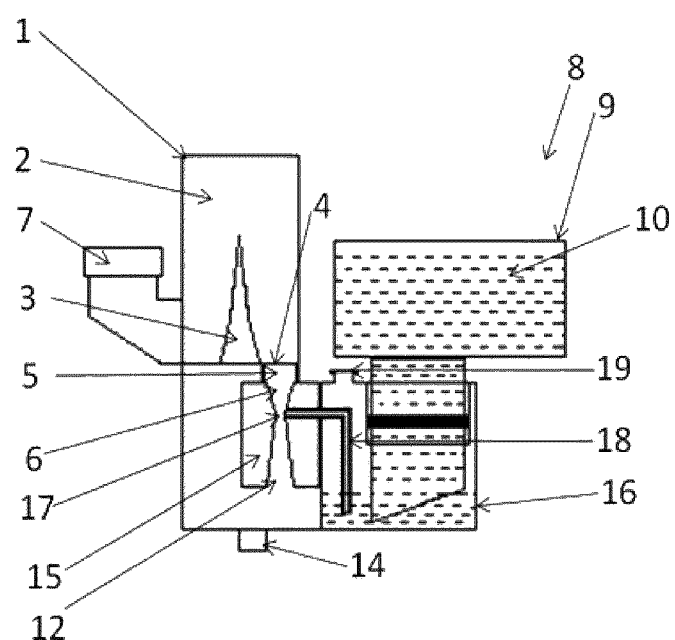
FIG. 2 is a perspective view of another embodiment of the dietary supplement dosing device.

FIG. 2 is a perspective view of another embodiment of the dietary supplement dosing device, comprising a dietary supplement cartridge (8) which has a container (9) holding at least one dietary supplement in a liquid form (10), a flow distribution chamber (2) and a differential pressure unit (15). The dietary supplement in the liquid form has preferably a viscosity in the range of 50 cP to 2000 cP and is maintained in fluid communication with a dispensing unit (16) provided with a vent (19) to maintain the unit at atmospheric pressure. The flow distribution chamber (2) has at least one water outlet opening (3) on an upwardly extending wall and a water outlet port (4). The water outlet port (4) of the flow distribution chamber (2) is connected to the entry port (6) of the differential pressure unit (15). The differential pressure unit having an exit port (12) is connected to the dispensing unit (16) at the point of minimum pressure (17) by means of a dosing tube (18). The device is attached to the faucet using a tap connector. The device comprises of an outlet (14) to dispense water containing the dietary supplement.

When the faucet is opened, water from the faucet enters the flow distribution chamber (2) through the tap connector by flowing into the water inlet port (7). The water is then divided into two streams, one stream flows through the water outlet opening (3) and the other stream flows into the water outlet port (4) and enters the entry port (6) of the differential pressure unit (15). As the water flows through the point of minimum pressure (17), the dietary supplement solution is sucked in through dosing tube (18) from the dispensing unit (16) to mix therein and is dispensed out through exit port (12). The water from the water outlet opening (3) and the exit port (12) of the cartridge containing the dietary supplement gets mixed and dispensed through outlet (14) as a single stream.

Figure 3:
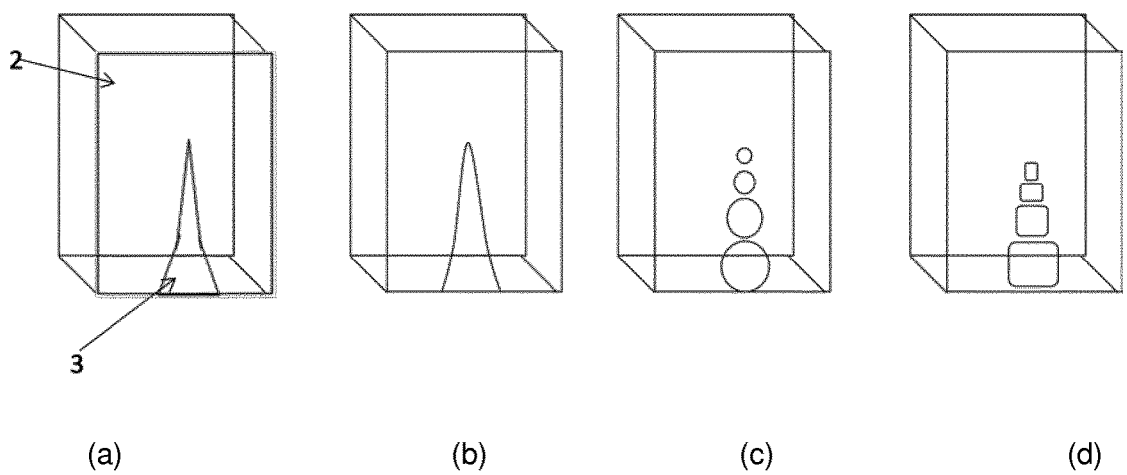
FIG. 3 is a front view of an embodiment of the flow distribution chamber showing various configurations of the water outlet opening.
Figure 4:
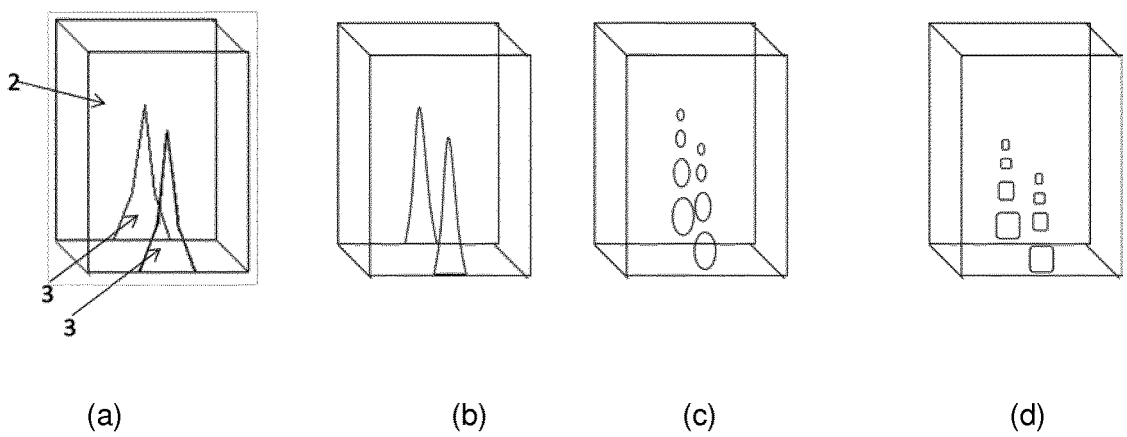
FIG. 4 is a front view of another embodiment of the flow distribution chamber showing various configurations of the water outlet opening.

The water outlet opening (3) may be located either on one upwardly extending wall (FIG. 3) or on more than one of the upwardly extending wall (FIG. 4), and can be as a single opening or distributed as plurality of openings.

The water outlet opening (3) can be shaped in such a way that the increase in the area of the opening is a non-linearly increasing function of the height of the opening on the chamber. The shape of the water outlet opening (3) can be triangular, triangular with a constriction at the middle, smooth parabolic, plurality of circles, ovals or squares.

EXAMPLES

Example 1

Preparation of Dietary Supplement

Dietary supplement tablet composition is provided in Table 1a and liquid composition is provided in Table 1 b. To make the dietary supplement tablet, the ingredients as mentioned in table 1a were weighed and blended in a blender to prepare a premix. The vitamin A, $B_{12}$ and $D_2$ and Zinc Sulfate was sourced from Piramal Health Care, Mumbai and Gum arabic was sourced from Nexira, France. The premix was made into tablets in a tableting machine (Hydraulic pellet press, Kimaya Engineering) under a pressure of 30 kg/cm². The average weight of the prepared tablet was 5 g.

TABLE 1a

Dietary supplement tablet composition

| Ingredient | Weight % for a solid form |
|---|---|
| Vitamin A palmitate 250 CWS | 8.7 |
| 5,6 DMB cyanocobalamine | 0.1 |
| Vitamin $D_2$ (100) powder | 1.8 |
| Zinc Sulfate | 14.4 |
| Gum Arabic - Binder | 75 |

To make the dietary supplement in the liquid form, the ingredients as mentioned in table 1b were added to 100 ml of microbiologically purified water and mixed well. The viscosity of the dietary supplement solution was adjusted by addition of a viscosifier i.e. Gum arabic to the dietary supplement solution.

TABLE 1b

Dietary supplement liquid composition

| Micronutrient | Weight % for a liquid form |
|---|---|
| Vitamin A Palmitate (1.7 mIU/g) | 0.16 |
| Vitamin B12 (1% on Mannitol) | 0.0118 |
| Vitamin D2 (5 mIU/g) | 0.0045 |
| Zinc (D- Gluconic acid Zinc Salt Hydrate) | 0.66 |
| Gum arabic | 28 |
| Water | 71 |

Example 2

Evaluation of the Dietary Supplement Dosed Water Produced Using Preferred Dietary Supplement Dosing Device A preferred dietary supplement dosing device (as shown in FIG. 1) was connected to the faucet of a water purification device using the tap connector. The tap connector was leading to the water inlet port of the flow distribution chamber which had a water outlet opening located on the upwardly extending wall of the chamber and it was shaped as shown in FIG. 3a, having a base measuring 10 mm and a total height of 25 mm. Starting with a base width measuring 10 mm the opening tapered down to a width of 3 mm at a height of 10 mm and further tapers to zero at a height of 25 mm and thus the area of the water outlet opening was a non-linearly increasing function of the height of the water outlet opening on the chamber. The water outlet port located on the base of the flow distribution chamber was connected to the entry port of the dietary supplement cartridge through a connector. The container of the dietary supplement cartridge was filled with two tablets prepared as described in Example 1. At a particular head, 1000 ml of the dietary supplement dosed water sample was collected from the outlet of the dietary supplement dosing device and analyzed for conductivity. The dietary supplement delivered to the water was calculated using a calibration curve of conductivity and % recommended dietary allowance (RDA) of dietary supplement per liter of water. % RDA dosed per liter of water and the corresponding flow rate at various water head is provided in Table 2.

TABLE 2

% RDA of dietary supplement dosed water and the flow rate delivered by a preferred dietary supplement dosing device

| Water head (cm) | % RDA dosing in 1 litre water | Flow rate (ml/min) |
|---|---|---|
| 22 | 18 | 1714 |
| 20 | 23 | 1579 |
| 18 | 23 | 1463 |
| 16 | 19 | 1364 |
| 14 | 16 | 1277 |
| 11 | 17 | 1176 |
| 8 | 19 | 1034 |
| 5 | 18 | 896 |
| 3 | 9 | 686 |
| Average | 18 | 1243 |

Table 2 confirms a uniform dosing of dietary supplement using a distribution chamber according to the invention at a flow rate in the range of 800 to 2000 ml/min.

Example 3

A first comparative dietary supplement dosing device as shown in FIG. 1 was connected to the faucet of a water purification device using the tap connector except that the flow distribution unit attached had a water outlet opening that was rectangular in shape so that the area of the opening was a linearly increasing function of the height of the water outlet opening on the chamber. The tap connector was leading to the water inlet port of the flow distribution chamber which had a water outlet opening located on the upwardly extending wall of the chamber. The water outlet port located on the base of the flow distribution chamber was connected to the dietary supplement cartridge through a connector. The connector was connected to the entry port of the dietary supplement cartridge. The container of the dietary supplement cartridge was filled with two tablets prepared as described in Example 1. At a particular head, 1000 ml of the dietary supplement dosed water sample was collected from the outlet of the dietary supplement dosing device and analyzed for conductivity. The dietary supplement delivered to the water was calculated using a calibration curve of conductivity and % RDA of dietary supplement per liter of water. % RDA dosed per liter of water and the corresponding flow rate at various water head is provided in Table 3.

TABLE 3

% RDA of dietary supplement dosed water and the flow rate delivered by a comparative dietary supplement dosing device

| Water head (cm) | % RDA dosing in 1 litre water | Flow rate (ml/min) |
| --- | --- | --- |
| 22 | 20 | 1818 |
| 20 | 25 | 1579 |
| 18 | 24 | 1579 |
| 16 | 32 | 1429 |
| 14 | 19 | 1500 |
| 11 | 29 | 1277 |
| 8 | 29 | 1250 |
| 5 | 29 | 968 |
| 3 | 34 | 769 |
| Average | 27 | 1352 |

It is clearly seen from the results in Table 3 that the dietary supplement dosed water dispensed through the comparative example delivers inconsistent amounts of dietary supplement at a flow rate range of 800 ml/min to 2000 ml/min.

It should be understood that the specific forms of the invention herein illustrated and described are intended to be representative only as certain changes may be made therein without departing from the clear teachings of the disclosure.

Although the invention has been described with reference to specific embodiments, it will be appreciated by those skilled in the art that the invention may be embodied in many other forms.

The invention claimed is:

1. A dietary supplement dosing device, comprising:
(a) a flow distribution unit;
(b) a dietary supplement cartridge;
wherein the flow distribution unit comprises a flow distribution chamber, comprising;
(i) a water inlet port,
(ii) at least one water outlet opening located on an upwardly extending wall of the flow distribution chamber and
(iii) a water outlet port, wherein the water outlet port is in fluid communication with a water entry port of the dietary supplement cartridge;
wherein the lowest point of said opening and the water outlet port are substantially at the same level;
wherein an area A spanning the area of the opening from its lowest point up to given height h is a non-linearly increasing function of the height h, wherein the height h runs from the lowest point of the opening up to the total height of opening; and wherein the water outlet opening comprises one or more through holes, wherein the holes are shaped such that the overall width of the opening at a given height h with respect to the lowest point of the opening decreases with increasing height h;
wherein the dietary supplement cartridge is configured to hold at least one dietary supplement in a solid or liquid form; wherein the dietary supplement cartridge further comprises:
(i) a dispensing unit, being configured to hold a dietary supplement stock solution having a viscosity in the range of 50 to 2000 cP, wherein the dispensing unit has a vent to the atmosphere, wherein the vent is configured to be positioned above a level of the dietary supplement stock solution;
(ii) an entry port connected to a differential pressure unit, comprising an exit port, a dosing tube connected at one end to a point of minimum pressure of the differential pressure unit while the other end of the dosing tube is configured to dip into the dietary supplement stock solution;
wherein the entry port is connectable to the water outlet port of the flow distribution chamber of the flow distribution unit.

2. The dietary supplement dosing device of claim 1, wherein the non-linearly increasing function is a power law function with an exponent that has a value between 0 and 1.

3. The dietary supplement dosing device of claim 1, wherein the largest width of the water outlet opening is close to the lowest point of the opening.

4. The dietary supplement dosing device of claim 1, wherein the total area of the water outlet opening available for flow of water is 2 to 10 times greater than the flow area of the water outlet port.

5. The dietary supplement dosing device of claim 1, wherein the flow distribution chamber is configured so that at least 60% of water entering into the flow distribution chamber passes through the opening.

6. The dietary supplement dosing device of claim 1, wherein the dietary supplement cartridge comprises a container configured to hold a water-leachable dietary supplement in the solid form resting on a base; wherein the base has at least one entry port for the passage of feed water and at least one exit port for the passage of water dosed with the dietary supplement; and wherein the entry port of the dietary supplement cartridge is connectable to the water outlet port of the flow distribution chamber of the flow distribution unit.

7. The dietary supplement dosing device of claim 6, wherein the lowest point of the water-leachable dietary supplement in solid form is not higher than the base of the said opening.

8. The dietary supplement dosing device of claim 6, wherein the water-leachable solid dietary supplement is a tablet.

9. The dietary supplement dosing device of claim 6, wherein the solid dietary supplement is a plurality of stacked dietary supplement tablets.

10. The dietary supplement dosing device of 1, wherein the inlet port of the flow distribution unit is connectable to a faucet of a gravity-fed water purification system comprising a filtration unit adapted to filter a particulate material, and a chemical purifying unit configured to hold a chemical purifying agent, in which the chemical purifying unit is housed in a sealed chamber and is in fluid communication with the filtration unit such that water treated by the filtration unit is then gravity-fed into the chemical purifying unit and retained therein for a predetermined period, before exiting the system via a scavenger means which is adapted to recover leached chemical purifying agent.

11. A flow distribution unit for the dietary supplement dosing device of claim 1, wherein the dietary supplement dosing device is further configured to allow a flow in the range of 100 to 3500 ml/min when in operation.

12. A flow distribution unit for the dietary supplement dosing device of claim 1, wherein the dietary supplement is selected from at least one of: a vitamin, a mineral, an electrolyte, a flavor, and a nutrient.

\* \* \* \* \*